United States Patent
Bhat

(10) Patent No.: US 9,800,875 B2
(45) Date of Patent: Oct. 24, 2017

(54) VIDEO CAMERA WITH RATE CONTROL VIDEO COMPRESSION

(71) Applicant: RED.COM, Inc, Irvine, CA (US)

(72) Inventor: Manjunath Subray Bhat, Thousand Oaks, CA (US)

(73) Assignee: RED.COM, LLC, Irvine, CA (US)

( * ) Notice: Subject to any disclaimer, the term of this patent is extended or adjusted under 35 U.S.C. 154(b) by 0 days.

(21) Appl. No.: 15/092,470

(22) Filed: Apr. 6, 2016

(65) Prior Publication Data

US 2016/0301894 A1    Oct. 13, 2016

Related U.S. Application Data

(60) Provisional application No. 62/145,969, filed on Apr. 10, 2015.

(51) Int. Cl.
| | |
|---|---|
| *H04N 5/917* | (2006.01) |
| *H04N 19/174* | (2014.01) |
| *H04N 19/124* | (2014.01) |
| *H04N 19/625* | (2014.01) |
| *H04N 19/176* | (2014.01) |
| *H04N 19/15* | (2014.01) |
| *H04N 5/77* | (2006.01) |
| *H04N 9/804* | (2006.01) |

(52) U.S. Cl.
CPC ........... *H04N 19/174* (2014.11); *H04N 5/772* (2013.01); *H04N 9/8045* (2013.01); *H04N 19/124* (2014.11); *H04N 19/15* (2014.11); *H04N 19/176* (2014.11); *H04N 19/625* (2014.11)

(58) Field of Classification Search
CPC .... H04N 19/124; H04N 19/15; H04N 19/174; H04N 19/176; H04N 19/625; H04N 5/772; H04N 9/8045
USPC ....... 375/240.01–240.29; 386/328–331, 335, 386/229; 382/232, 239, 251
See application file for complete search history.

(56) References Cited

U.S. PATENT DOCUMENTS 5,602,594 A * 2/1997 Cho ...................... H04N 19/503
                                                        348/700
5,650,860 A * 7/1997 Uz ........................ H04N 19/176
                                                        375/240.24

(Continued)

OTHER PUBLICATIONS

International Search Report and Written Opinion for International Application No. PCT/US2016/026211, mailed Jul. 12, 2016, in 10 pages.

*Primary Examiner* — Thai Tran
*Assistant Examiner* — Stephen Smith
(74) *Attorney, Agent, or Firm* — Knobbe, Martens, Olson & Bear LLP

(57) ABSTRACT

Embodiments provide a video camera that can be configured to compress video data in a manner that achieves a targeted output size in a computationally efficient manner. The video compression systems and methods can be used with DCT-based compression standards to include a rate control aspect. The rate controlled video compression methods can be configured to compress video data in, real time and/or using a single pass. During compression of video data, the video compression systems and methods can modify compression parameters to achieve a targeted file size while maintaining relatively high visual quality of the compressed images.

20 Claims, 9 Drawing Sheets

(56) References Cited

U.S. PATENT DOCUMENTS

| | | | | |
|---|---|---|---|---|
| 5,745,178 A * | 4/1998 | Hartung | ............... | H04N 19/172 375/240.04 |
| 5,999,218 A * | 12/1999 | Yokoyama | ........... | H04N 19/176 341/200 |
| 6,504,494 B1 * | 1/2003 | Dyas | .................... | H04N 19/176 341/50 |
| 6,597,860 B2 * | 7/2003 | Song | .................. | G11B 15/1875 348/E5.051 |
| 2001/0014123 A1 * | 8/2001 | Strasman | ............. | H04N 19/172 375/240.13 |
| 2007/0286278 A1 * | 12/2007 | Govindaswamy | . | H04N 7/17318 375/240.03 |
| 2007/0291849 A1 * | 12/2007 | Lainema | ................ | H04N 19/70 375/240.18 |
| 2008/0304564 A1 * | 12/2008 | Kim | .................... | H04N 19/197 375/240.03 |
| 2011/0149110 A1 * | 6/2011 | Sugiyama | .......... | H04N 5/23203 348/223.1 |
| 2011/0206115 A1 * | 8/2011 | Okumura | ............. | H04N 19/176 375/240.03 |
| 2011/0268180 A1 * | 11/2011 | Srinivasamurthy | .. | H04N 19/176 375/240.03 |
| 2013/0051457 A1 * | 2/2013 | Joshi | .................... | H04N 19/147 375/240.03 |
| 2013/0202050 A1 * | 8/2013 | Koto | ...................... | H04N 19/44 375/240.25 |
| 2014/0341278 A1 * | 11/2014 | Zheng | ................... | H04N 19/70 375/240.03 |
| 2015/0288965 A1 * | 10/2015 | Li | ....................... | H04N 19/124 375/240.03 |
| 2016/0094846 A1 * | 3/2016 | Lee | ..................... | H04N 19/124 375/240.03 |

* cited by examiner

VIDEO CAMERA WITH RATE CONTROL VIDEO COMPRESSION

CROSS-REFERENCE TO RELATED APPLICATIONS

This application claims the benefit of priority to U.S. Prov. Pat. App'n No. 62/145,969, entitled "Video Camera with Rate Control Video Compression," filed Apr. 10, 2015, the entire contents of which is incorporated by reference herein for all purposes.

BACKGROUND

Field

The present disclosure is directed to digital cameras, such as those for capturing moving pictures, and more particularly, to digital cameras that compress video data.

Description of Related Art

With the availability of digital video cameras, producers of major motion pictures, television broadcast media, commercials and other video creators can capture and edit digital video. Capturing high quality video (e.g., high frame rate and/or high resolution) can require a relatively large amount of digital storage. Compressing high quality video can be computationally expensive and/or time consuming.

SUMMARY

Although some currently available digital video cameras include high resolution image sensors, and thus are capable of recording, storing, and/or providing high resolution video, the image compression techniques used on board such cameras can be computationally expensive. Some digital cameras do not compress video on board the camera, and the resulting video files can become relatively large compared to compressed video. Such digital video cameras can be limited in the amount of uncompressed video that can be stored onboard and/or can be expensive due to the large amounts of digital storage built into the camera. Some digital cameras compress video data using compression algorithms that are not compatible with typical or widely-used video editing software. For cameras that do not store video in a compressed format compatible with video editing software, when the captured video is to be edited, the stored video data generally needs to be compressed using a standard compression algorithm. The additional step of applying these compression algorithms to stored video data can add complexity to work flow, can be time-consuming, and/or can be frustrating to users of the video camera. Some digital cameras compress video on board the camera, but do so in a computationally expensive or inefficient manner. Such cameras can require expensive computing hardware to handle these compression tasks. Even where video is compressed on board, the compressed video may still be relatively large, requiring a large amount of digital storage. Accordingly, an aspect of some embodiments disclosed herein includes a video camera that is configured to perform video compression, on board utilizing techniques that are relatively computationally efficient, that can be done in real time, that can generate video files ready for video editing, and/or that can have a relatively small file size.

Thus, in accordance with some embodiments, a video camera can comprise a portable housing and a lens assembly supported by the housing and configured to focus light. A light sensitive device and associated electronics can be configured to convert the focused light into raw image data. The camera can also include a memory device, an image processing device, and a video compression device, the devices collectively and/or individually configured to process the raw and/or compressed image data, to compress the processed and/or raw image data, and to store the compressed video data in the memory device. In some implementations, the video compression device can be configured to apply a rate control algorithm operating with a discrete cosine transform ("DCT") to generate compressed video data in real time.

In accordance with certain embodiments, a method of recording video with a video camera can include directing light onto an image sensor. The method can also include converting the light received by the image sensor into raw digital image data, processing the raw digital image data, and compressing the processed image data using a rate control algorithm operating with a DCT, and recording or storing the compressed image data onto a storage device.

In accordance with some embodiments, a video camera can comprise a lens assembly supported by the housing and configured to focus light and a light sensitive device configured to convert the focused light into a signal of raw image data representing the focused light. The camera can also include a memory device and a video compression device for compressing and recording the compressed image data at a frame rate of at least about 30 frames per second. In a further implementation, the camera can be configured to compress and record compressed image data at a frame rate of at least about 50 frames per second or at least about 60 frames per second. In some implementations, the camera can be configured to compress and record compressed image data at a frame rate of at least about 30 frames per second where each frame of raw image data includes at least 1280 horizontal pixels. In some implementations, the camera can be configured to compress and record compressed image data at a frame rate of at least about 23 frames per second, at least about 30 frames per second, at least about 50 frames per second, or at least about 60 frames per second, where individual frames of raw image data include a two-dimensional array of pixels with at least 1280 pixels in one dimension, at least 1920 pixels in one dimension, at least 3840 pixels in one dimension, or at least 4000 pixels in one dimension. In some implementations, the camera can be configured to compress and record compressed image data at a frame rate of at least about 23 frames per second, at least about 30 frames per second, at least about 50 frames per second, or at least about 60 frames per second where individual frames of raw image data include a two-dimensional array of pixels with at least 1280×720 pixels, at least 1920×1080 pixels, at least 3840×2160 pixels, or at least 4000×3000 pixels. In some implementations, the video compression device can be configured to compress and store in the memory device the compressed image data using a single-pass compression algorithm that does not utilize frame memory during compression. In certain implementations, the video compression device can compress the raw image data at a rate of at least about 4 frames per second, at least about 23 frames per second, at least about 24 frames per second, at least about 30 frames per second, at least about 50 frames per second, or at least about 60 frames per second.

In accordance with some embodiments, a video camera can comprise a portable housing having at least one handle configured to allow a user to manipulate the orientation with respect to at least one degree of movement of the housing during a video recording operation of the camera. A lens assembly can comprise at least one lens supported by the housing and configured to focus light at a plane disposed inside the housing. A light sensitive device can be configured to convert the focused light into raw image data with a horizontal resolution of at least 1280 pixels and at a frame rate of at least about 4 frames per second. A memory device can also be configured to store compressed video image data. An image processing system can be configured to process the raw video image data. A video compression system can be configured to compress and store in the memory device the compressed image data using a single-pass compression algorithm that does not utilize frame memory during compression, wherein the video compression system can compress image data at a rate of at least about 4 frames per second.

Another aspect of some embodiments disclosed herein includes the realization that a single-pass compression algorithm can be implemented that complies with discrete cosine transform (DCT) compression standards. Because the single-pass compression algorithm complies with certain DCT compression standards, the output of the compression algorithm can be compatible with video editing software that accepts video compressed using DCT compression standards (e.g., the Apple® ProRes family of video codecs, MPEG-2, H.264, MPEG-4, MJPEG, DV, Daala, Theora, etc.).

Another aspect of some embodiments disclosed herein includes the realization that a single-pass video compression algorithm can be implemented that modifies compression parameters to achieve a target frame size and/or to achieve a frame size that is less than or equal to a maximum video frame size for each video frame (e.g., where size here refers to the amount of digital data used to represent the compressed video frame). The compression algorithm can be performed in a single pass due at least in part to the compression parameters being calculated using results of compression of a previous section(s) of a frame and/or a previous video frame(s). This allows the single-pass compression algorithm to be used where bandwidth limits dictate video bit rates, which are related to the number of bytes per frame of compressed video, such as in conjunction with broadcasting standards. This also allows the compression algorithm to operate without utilizing frame memory during compression (e.g., previous frames are not put into a frame memory for utilization during compression of the current frame).

In some embodiments, a video compression system can compress video data by processing individual video frames. The video compression system can divide an individual video frame into a plurality of sections and can divide each section into a plurality of slices. In some embodiments, slices can be further divided into macroblocks and macroblocks can be divided into blocks. In typical applications, a block size can be 8×8 pixels and a macroblock size can be 16×16 pixels, or 4 blocks. Different sizes of blocks and macroblocks can also be used. For each slice within a section, the compression algorithm can apply a DCT to determine DCT coefficients for the slice. This can be accomplished, for example, by applying a two-dimensional DCT on each block in the slice. The amount of information in the slice can be used to determine compression parameters that can be used to adjust a quantization table used to quantize the DCT coefficients. When the slices in a particular section have been compressed, the current size of the compressed frame can be compared to a targeted frame size, wherein the comparison takes into account the fraction of the frame that has already been processed, to adjust compression parameters used in the DCT. When all of the sections of a video frame have been compressed, the size of the compressed video frame can be compared to a targeted or maximum frame size. Based at least in part on this comparison, compression parameters can be modified for compression of the following video frame. Accordingly, the compression algorithm can be configured to modify or adjust compression parameters during compression of a video frame to achieve a targeted frame size. Similarly, the compression algorithm can be configured to modify or adjust compression parameters from frame to frame to achieve a targeted frame size.

In some embodiments, the video compression system can be implemented as part of a video camera. The video compression system can be implemented using hardware, software, or a combination of both hardware and software. In some embodiments, the video compression system can be implemented separate from a video camera. For example, the video compression system can be part of a video editing suite of programs. In certain implementations, functionality provided by the video compression methods disclosed herein is included in a software development kit.

The video compression systems and methods disclosed herein can be relatively computationally efficient. As used herein, computationally efficient can refer to an efficient use of processor cycles, processor power, memory, or the like. Thus, a procedure is relatively computationally efficient where it utilizes fewer computational resources (e.g., processor cycles, processor power, memory, etc.) than another procedure. This can result in reduced-cost video cameras. The single-pass algorithm can also be configured to compress video in real time at relatively high frame rates (e.g., at least 23 frames per second, at least about 24 frames per second, at least about 30 frames per second, at least about 50 frames per second, at least about 60 frames per second, etc.). The single-pass algorithm can also be configured to compress video in real time at relatively high resolutions (e.g., at least 1280 horizontal pixels, at least about 1920 horizontal pixels, at least about 3840 horizontal pixels, at least about 4000 horizontal pixels, at least about 6000 horizontal pixels, etc.).

The video compression systems and methods disclosed herein provide a number of advantages. For example, the disclosed video compression can be configured to provide real-time video compression at relatively high frame rates and/or relatively high resolutions. The disclosed video compression can be configured to compress video using a standard format for use with video editing tools. The disclosed video compression can be configured to compress video data in real time for storage on board a video camera. The disclosed video compression can be configured to reduce a file size of compressed video relative to other video compression schemes that utilize DCTs. The disclosed video compression can be configured to provide the advantage of a reduced file size while also maintaining or surpassing the visual quality of the compressed video frames relative to those other video compression schemes. The disclosed video compression can take advantage of similarity between consecutive frames to reduce compressed video frame sizes. The disclosed video compression can account for scene changes by making intra-frame adjustments to compression parameters. The disclosed video compression can implement multi-tiered compression techniques. For example, when the number of bits generated for a portion of a video frame exceeds a target size, another tier of rate controls can be utilized so that the final video frame size can be less than a desired, selected, targeted, or maximum video frame size. The disclosed video compression can be performed in a single pass, thereby reducing computational costs. The disclosed video compression can be configured to adjust compression parameters based at least in part on compression results within a frame of image data (e.g., a rate control compression algorithm). The disclosed video compression can be configured to adjust compression parameters based at least in part on compression results from one or more previous frames of image data (e.g., a rate control compression algorithm).

BRIEF DESCRIPTION OF THE DRAWINGS

The following figures are used to illustrate example embodiments of the systems and methods disclosed herein and are not intended to limit the scope of the disclosure. Throughout the drawings, like numbers can be used to refer to like elements.

DETAILED DESCRIPTION

Disclosed herein are video compression systems and methods that can adjust compression parameters during compression to achieve targeted file sizes, video frame sizes, video bit rates, and the like. The video compression systems and methods are described herein as being compatible with DCT-based compression standards. Thus, the output of the described video compression systems and methods can be compatible with tools, software, and/or programs configured to operate on files compressed using DCT-based compression techniques. For example, decoders configured to decode video compressed using DCT-based compression standards can be capable of decoding video compressed with the video compression methods and systems disclosed herein. Examples of DCT-based video compression standards that may be compatible with the video compression systems and methods described herein include, without limitation, JPEG, MJPEG, Theora, MPEG-1, MPEG-2, H.261, H.263, H.264/AVC, H.265/HEVC, etc.

Example Video Cameras

Figure 1:
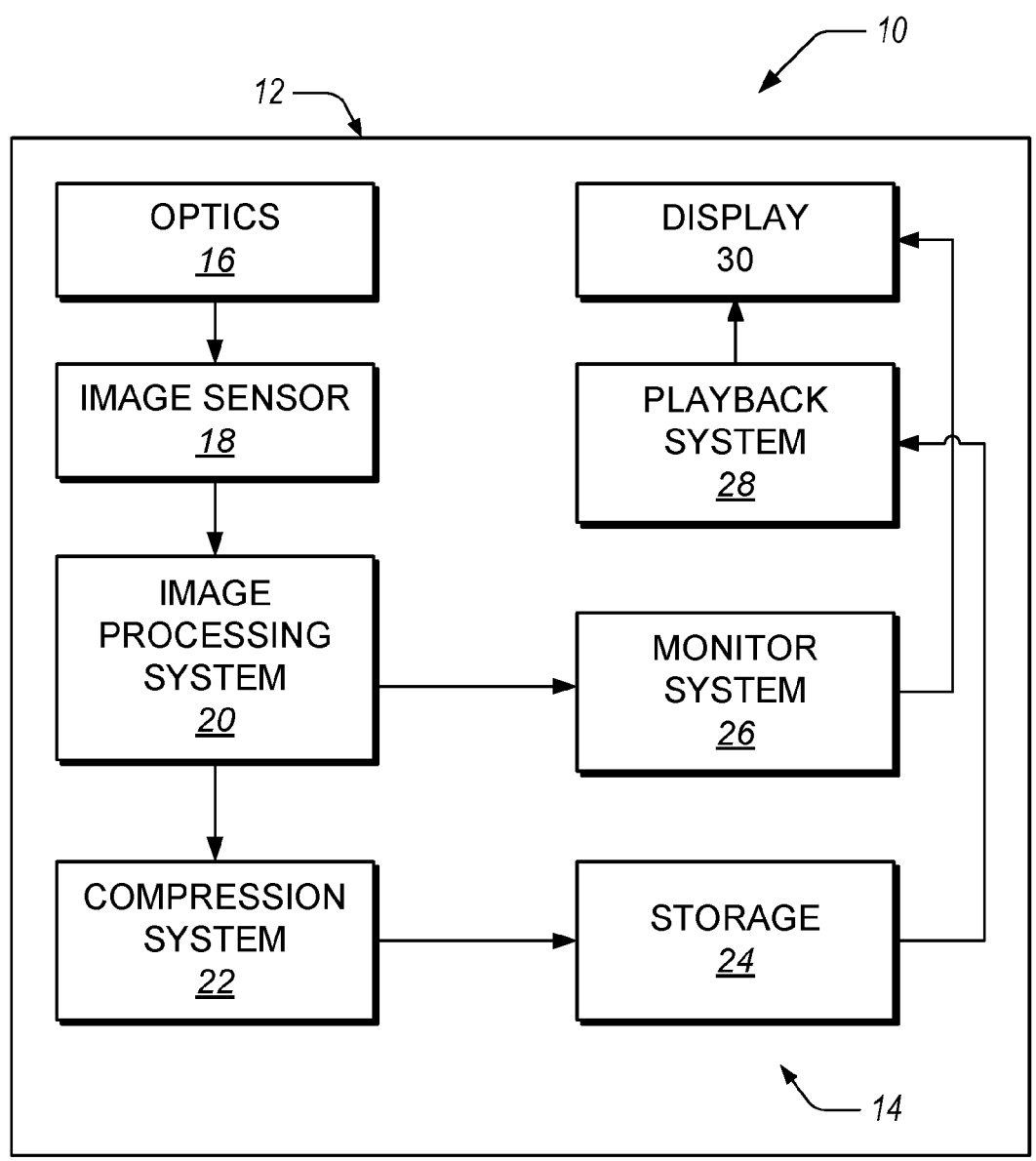
FIG. 1 illustrates a schematic diagram of a video camera configured to implement video compression with rate control.

FIG. 1 illustrates a schematic diagram of a video camera 10 that can include a body or housing 12 configured to support a system 14 configured to detect, process, compress, store and/or replay video image data. For example, the system 14 can include optics hardware 16, an image sensor 18, an image processing system 20, a compression system 22, and a storage device 24. In some implementations, the video camera 10 can also include a monitor system 26, a playback system 28, and a display 30.

Figure 2:
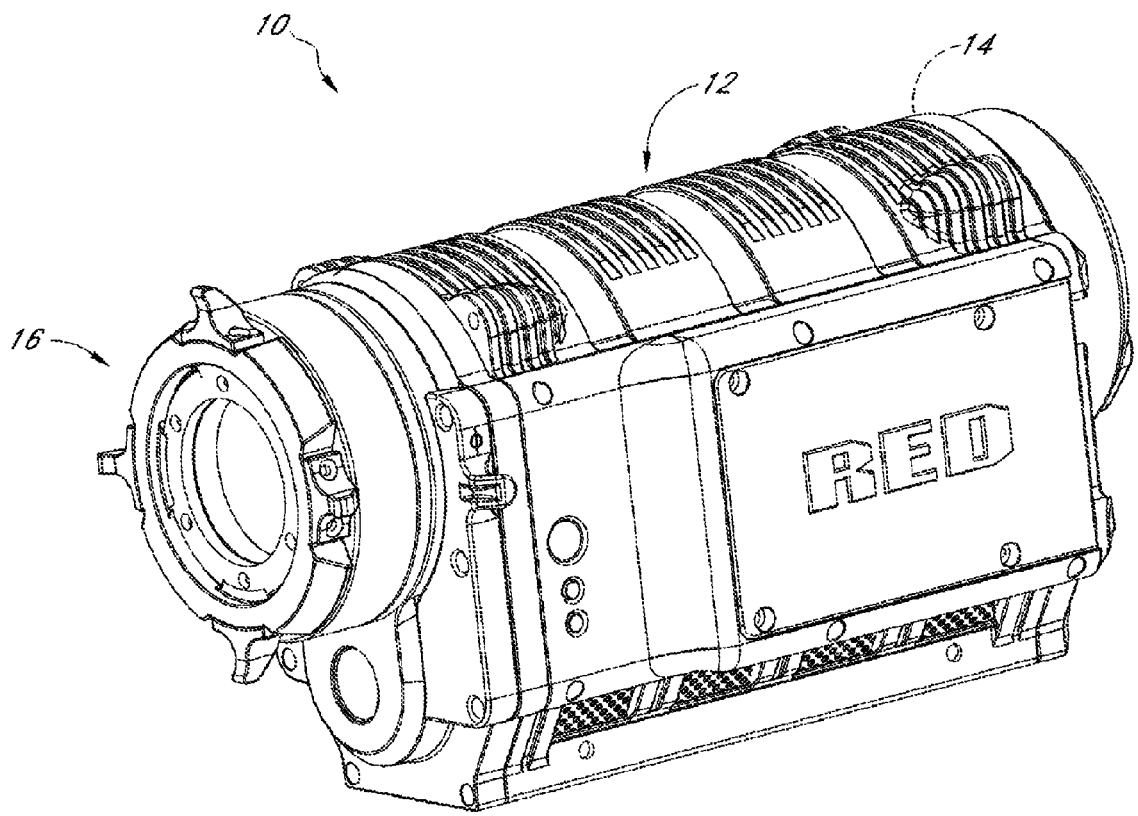
FIG. 2 illustrates an example embodiment of a video camera configured to implement video compression with rate control.

FIG. 2 illustrates an exemplary embodiment of the video camera 10. The optics hardware 16 can be supported by the housing 12 in a manner that leaves a portion of the optics hardware 16 exposed at an outer surface of the housing 12. In some embodiments, the system 14 is supported within the housing 12. For example, the image sensor 18, image processing system 20, and the compression system 22 can be housed within the housing 12. The storage device 24 can be mounted in the housing 12. In some embodiments, the storage device 24 can be mounted to an exterior of the housing 12 and connected to the remaining portions of the system 14 through any type of known connector or cable. Additionally, the storage device 24 can be connected to the housing 12 with a flexible cable, thus allowing the storage device 24 to be moved somewhat independently from the housing 12. For example, with such a flexible cable connection, the storage device 24 can be worn on a belt of a user, allowing the total weight of the housing 12 to be reduced. In certain embodiments, the housing 12 can include one or more storage devices 24 inside and mounted to its exterior. The housing 12 can be configured to support the monitor system 26 and playback system 28. In certain embodiments, the display 30 can be configured to be mounted to an exterior of the housing 12.

The optics hardware 16 can be in the form of a lens system having at least one lens configured to focus an incoming image onto the image sensor 18. In some embodiments, the optics hardware 16 can be in the form of a multi-lens system providing variable zoom, aperture, and focus. The optics hardware 16 can be in the form of a lens socket supported by the housing 12 and configured to receive a plurality of different types of lens systems for example, but without limitation, the optics hardware 16 can include a socket configured to receive various sizes of lens systems including a 50-100 millimeter (F2.8) zoom lens, an 18-50 millimeter (F2.8) zoom lens, a 300 millimeter (F2.8) lens, 15 millimeter (F2.8) lens, 25 millimeter (F1.9) lens, 35 millimeter (F1.9) lens, 50 millimeter (F1.9) lens, 85 millimeter (F1.9) lens, and/or any other lens. As noted above, the optics hardware 16 can be configured such that images can be focused upon a light-sensitive surface of the image sensor 18 despite which lens is attached thereto.

The image sensor 18 can be any type of video sensing device, including, for example, but without limitation, CCD, CMOS, vertically-stacked CMOS devices such as the Foveon® sensor, or a multi-sensor array using a prism to divide light between the sensors. In some embodiments, the image sensor 18 can include a CMOS device having about 12 million photocells. However, other size sensors can also be used. In some configurations, video camera 10 can be configured to output video at "2 k" (e.g., 2048×1152 pixels), "4 k" (e.g., 4,096×2,540 pixels), "4.5 k," "5 k," "6 k," and/or "8 k" or greater resolutions. As used herein, in the terms expressed in the format of "xk" (such as "2 k" and "4 k" noted above), the "x" quantity refers to the approximate horizontal resolution. As such, "4 k" resolution corresponds to about 4000 or more horizontal pixels and "2 k" corresponds to about 2000 or more pixels. Using currently commercially available hardware, the image sensor 18 can be as small as about 0.5 inches (8 mm), but it can be about 1.0 inches, or larger. Additionally, the image sensor 18 can be configured to provide variable resolution by selectively outputting only a predetermined portion of the image sensor 18. For example, the image sensor 18 and/or the image processing system 20 can be configured to allow a user to identify, configure, select, or define the resolution of the video data output.

The video camera 10 can also be configured to downsample and subsequently process the output of the image sensor 18 to yield video output at "2 k," 1080 p, 720 p, or any other resolution. For example, the image data from the sensor 18 can be "windowed," thereby reducing the size of the output image and allowing for higher readout speeds. However, other size sensors can also be used. Additionally, the video camera 10 can be configured to up-sample the output of the image sensor 18 to yield video output at higher resolutions.

With reference to FIG. 1, the image processing system 20 of the video camera 10 can be configured to process raw video data provided by the image sensor 18. For example, the image sensor 18 can be configured to provide color image data de-mosaiced according to a pattern and comprising a plurality of picture element values for each of a plurality of spatially interleaved color channels. The image processing system 20 can be configured to process the picture element values to combine, subtract, multiply, divide, or otherwise modify the picture dements to generate a digital representation of the image data. For example, the digital representation can, be expressed using RGB values, gamma corrected RGB values, Y'CbCr values (e.g., where Y' is referred to as "luma" and CbCr is referred to as "chroma" components), or the like. The image processing system 20 can include other systems or modules and/or can be configured to perform other processes, such as, for example, but without limitation, gamma correction processes, noise filtering processes, etc. Examples of functionality provided by the image processing system 20 are described in U.S. patent application Ser. No. 14/180,168 filed Feb. 13, 2014 and entitled "Video Camera" (published as U.S. Pub. No. 2014/0226036), which is incorporated herein by reference in its entirety for all purposes.

The video camera 10 can include a compression system 22. The compression system 22 can be in the form of a separate chip or chips (e.g., FPGA, ASIC, etc.), it can be implemented with software and another processor, and/or it can be implemented with a combination of processors, software, and/or dedicated chips. For example, the compression system 22 can include a compression chip that performs a compression technique in accordance with DCT-based codecs. The compression chip can be configured to include the rate control aspects of the compression techniques described herein.

The compression system 22 can be configured to compress the image data from the image processing system 20 using DCT-based codecs with rate control, aspects of which are described herein in greater detail with reference to FIGS. 3-9. In some embodiments, the compression system 22 performs a compression technique that modifies or updates compression parameters during compression of video data. The modified or updated compression parameters can be configured to achieve targeted or desired file sizes, video quality, video bit rates, or any combination of these. In some embodiments, the compression system 22 can be configured to allow a user or other system to adjust compression parameters to modify the quality and/or size of the compressed video output by the compression system 22. For example, the video camera 10 can include a user interface that allows a user to input commands that cause the compression system 22 to change compression parameters.

The compression system 22 can be configured to compress the image data from the image processing system 20 in real time. The compression system 22 can perform compression using a single-pass to compress video frames. This can be used to eliminate the use of an intermediate frame memory used in some compression systems to perform multiple compression passes and/or to compress a current video frame based on the content from one or more previous video frames stored in an intermediate frame memory. This can reduce the cost and/or complexity of a video camera with on-board video compression. The compression system 22 can be configured to compress image data from the image processing system 20 in real time when the frame rate of the image data is at least 23 frames per second ("fps"), at least about 24 fps (e.g., 23.976 fps), at least about 25 fps, at least about 30 fps (e.g., 29.97 fps), at least about 48 fps, at least about 50 fps, at least about 60 fps (e.g., 59.94 fps), at least about 120 fps, at least about 240 fps, and/or less than or equal to about 240 fps. The compressed video can thus be sent to a storage device 24 and/or the monitor system 26.

The storage device 24 of the video camera can be in the form of any type of digital storage, such as, for example, but without limitation, hard disks, flash memory, or any other type of memory device. In some embodiments, the size of the storage device 24 can be sufficiently large to store image data from the compression system 22 corresponding to at least about 30 minutes of video at 12 megapixel resolution, 12-bit color resolution, and at 60 fps. However, the storage device 24 can have any size.

In some embodiments, the storage device 24 can be mounted on an exterior of the housing 12. Further, in some embodiments, the storage device 24 can be connected to the other components of the system 14 through standard communication ports, including, for example, but without limitation, IEEE 1394, USB 3.0, IDE, SATA, etc. Further, in some embodiments, the storage device 24 can comprise a plurality of hard drives operating under a RAID protocol. However, any type of storage device can be used.

The system 14 includes, in some implementations, a monitor system 26 and a display device 30 configured to allow a user to view video images captured by the image sensor 18 during operation. In some embodiments, the image processing system 20 can include a subsampling system configured to output reduced resolution image data to the monitor system 26. For example, such a subsampling system can be configured to output video image data to support "2 k," 1080 p, 720 p, or any other resolution. In some embodiments, filters used for de-mosaicing can be adapted to also perform down-sampling filtering, such that down-sampling and filtering can be performed at the same time. The monitor system 26 can be configured to perform any type of de-mosaicing process to the data from the image processing system 20. Thereafter, the monitor system 26 can output a de-mosaiced image data to the display 30.

The display 30 can be any type of monitoring device. For example, but without limitation, the display 30 can be a four-inch LCD panel supported by the housing 12. For example, in some embodiments, the display 30 can be connected to an infinitely adjustable mount configured to allow the display 30 to be adjusted to any position relative to the housing 12 so that a user can view the display 30 at any angle relative to the housing 12. In some embodiments, the display 30 can be connected to the monitor system 26 through any suitable video cables such as, for example but without limitation, HDMI cables, HD-SDI cables, RGB cables, or YCC format video cables.

The video camera 10 can include a playback system 28 that can be configured to receive data from the storage device 24 and/or from the compression system 22, to decompress and to de-mosaic the image data, and to output the image data to the display 30. In some embodiments, the monitor system 26 and the playback system 28 can be connected to the display 30 through an, intermediary display controller (not shown). As such, the display 30 can, be connected with a single connector to the display controller. The display controller can be configured to transfer data from either the monitor system 26 or the playback system 28 to the display 30.

Example Video Compression Methods

Figure 3:
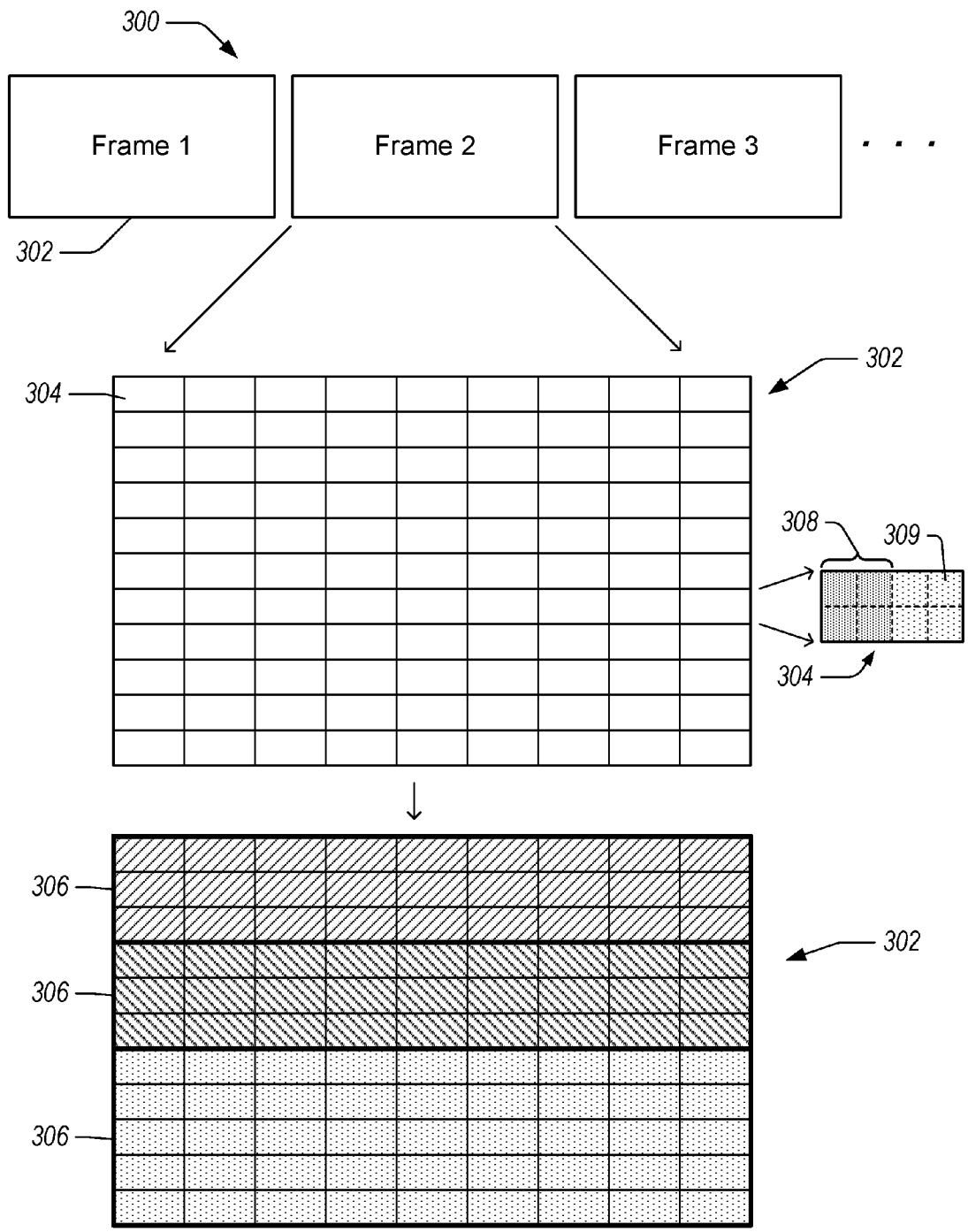
FIG. 3 illustrates a block diagram of a process of dividing up video data into sections and slices for video compression with rate control.

FIG. 3 illustrates a block diagram of a process of dividing up video data into video frames (or sub-frames), sections, and slices for application of a rate control video compression algorithm. Dividing the video data into video frames, sections, and slices can allow for the video compression systems and methods described herein to modify compression parameters during compression of a video frame to achieve a file size or a frame size that is within a targeted range and/or that is less than a maximum file size or frame size. As used herein, the term "rate control" as used in conjunction with compression algorithms generally refers to a compression algorithm that dynamically modifies parameters of the algorithm based at least in part on resulting compression sizes. This dynamic modification can occur based at least in part on compression sizes within a frame (or sub-frame) of image data and/or on compression sizes from frame to frame.

Advantageously, the disclosed video compression systems and methods can be configured to achieve frame sizes within targeted or desired size ranges in real time. As used herein, compressing video data in real time can mean that a single frame of video is compressed prior to the next frame of video being presented for compression. For example, if video data has a frame rate of about 30 fps, then the video compression system can be configured to compress a frame of video in less than about ⅟30th of a second.

Similarly, dividing video frames into sections and slices can allow for the disclosed video compression systems and methods to compress video data in a single pass. As used herein, compressing video data in a single pass (e.g., a single-pass compression algorithm) can mean that the video compression system compresses a slice, section, and/or video frame a single time and does not perform multiple compressions or multiple passes at compressing the single video frame, section, or slice. For example, after quantizing DCT coefficients of a particular slice of a video frame, the video compression system does not generate or calculate quantized DCT coefficients for that same slice of the video frame again. The disclosed single-pass video compression algorithms can thus be implemented in a system without using frame memory (e.g., an intermediate memory for frames) to store a previous video frame(s).

Video data 300 can be provided as a series of video frames 302, each video frame 302 being an array of picture elements, or pixels. Video frames 302 can be a sub-frame wherein a sub-frame comprises subset of the pixels available in the raw image data, such as the raw image data acquired with an image sensor. In some implementations, the pixels of a video frame 302 can form an image. The pixels of a video frame 302 can represent intensity (e.g., a gray-level value), colors (e.g., red, green, blue), luma and/or chroma (e.g., Y'CrCb), an alpha channel, or the like. In some implementations, a particular video frame 302 can have pixel values that represent differences between previous and/or subsequent video frames. It is to be understood that a video frame 302 is not limited to an array of pixel values that represent color and/or intensity at that pixel. The video compression systems and methods disclosed herein can be configured to operate on video frames that have been processed such that the pixel values represent, for example and without limitation, motion estimation between video frames (e.g., motion estimation) and/or estimations based on adjacent or neighboring blocks of pixels (e.g., intra-estimation).

Each video frame 302 can be divided into slices 304. In some implementations, each slice 304 can have the same number of pixels. For example, each slice can be a rectangle of 128×16 pixels, a rectangle of 64×16 pixels, or a square of 16×16 pixels. In some embodiments, each slice 304 can be divided into one or more macroblocks 308. In certain implementations, each macroblock can be a square of 16×16 pixels. Each macroblock 308 can be further divided into blocks 309. In certain implementations, a block 309 is a square of 8×8 pixels. The macroblock 308, in some implementations, can be made up of 4 blocks. Other sizes of slices can be used, such as slices that have a different number of horizontal pixels and/or vertical pixels. Slices 304 can be grouped together into sections 306. The sections 306 can be configured to extend across (e.g., vertically or horizontally) an entire video frame 302. The sections 306 can be of different sizes (e.g., each section 306 can have a different number of slices 304 and/or a different number of pixels). In some implementations, the video frame 302 is divided into a single section 306. In certain implementations, the video frame 302 is divided into a single slice 304.

In some embodiments, each slice 304 of the video frame 302 can have its own quantization table. In certain implementations, the quantization table of each slice 304 of the video frame 302 can be generated by using a function to transform a fixed or standard quantization table. For example, the fixed or standard quantization table can be multiplied by a variable value.

Figure 4:
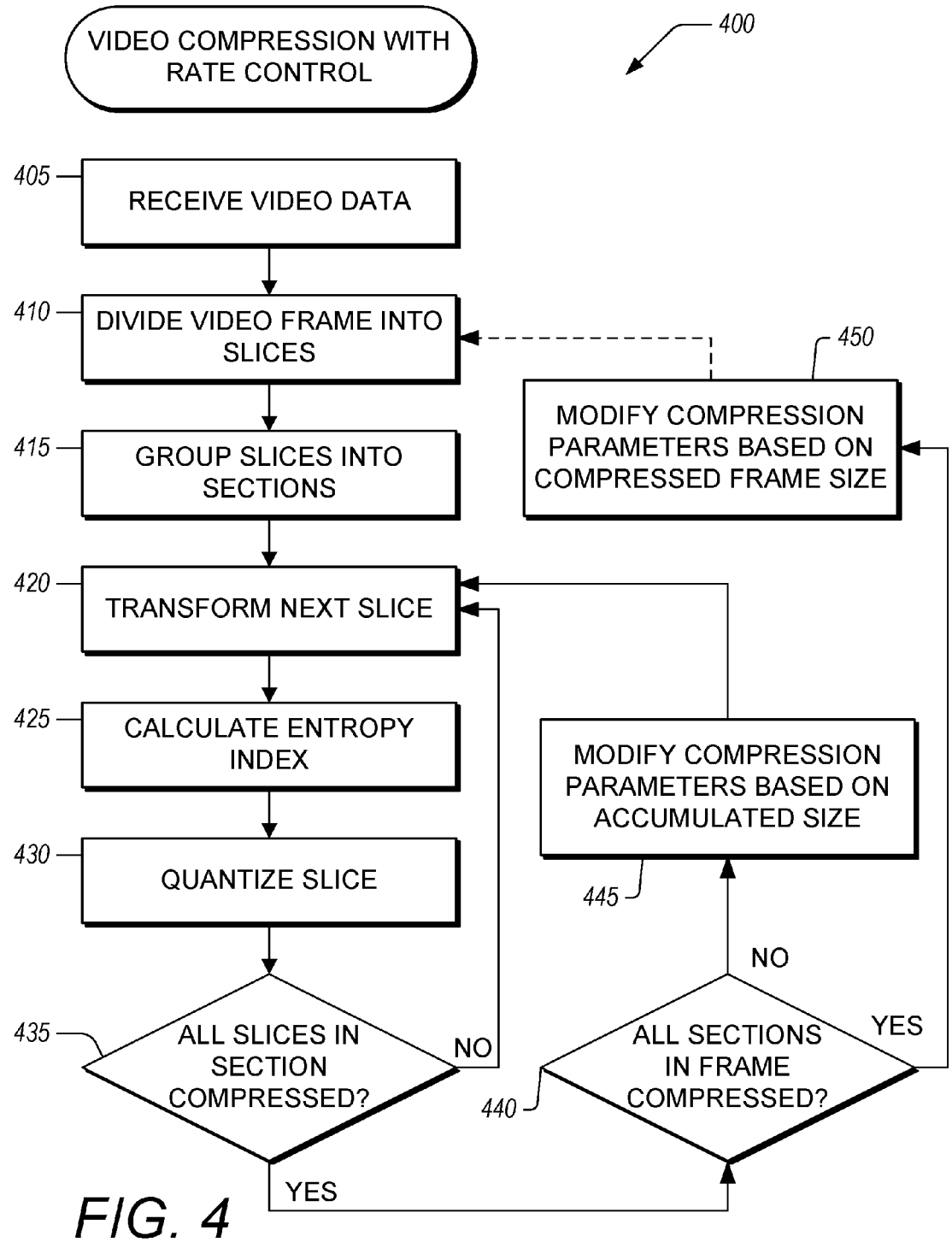
FIG. 4 illustrates a flow chart of an example method of video compression with rate control.

FIG. 4 illustrates a flow chart of an example method 400 of video compression with rate control. In some embodiments, the method 400 can represent a control routine stored in a memory device, such as the storage device 24, or another storage device (not shown) within the video camera 10. Additionally, a central processing unit (CPU) (not shown) can be configured to execute the control routine. In some embodiments, the method 400 can represent a control routine implemented in a separate chip or chips (e.g., FPGA, ASIC, etc.). In some embodiments, the method 400 can represent a control routine stored in a memory device on a machine different from the video camera 10, such as a video processing system or video editing system. The method 400 can be applied to the processing of continuous video, e.g., frame rates of greater than 12, as well as frame rates of 20, 23.976, 24, 25, 29.97, 30, 50, 59.94, 60, 120, 240 or other frame rates between these frame rates or greater. For ease of description, the methods disclosed herein with reference to FIGS. 3-9 will be described as being performed by a video compression system, such as the compression system 22 described herein with reference to FIG. 1. However, one or more steps of a disclosed method may be performed by a particular component of the video compression system, a different system or module, or a different device. Similarly, a single step of a disclosed method may be performed by a combination of components in the video compression system, a combination of devices, or a combination of systems.

With reference to FIG. 4, the video compression system receives video data comprising a plurality of video frames in block 405. The video compression system can receive the video data from an image sensor, an image processing system, or a storage device on a video camera or other device. For example, the video compression system can be implemented on board a video camera and can be configured to compress video data acquired with the video camera. In some implementations, the video compression system is configured to compress video data received from the video camera in real time. The video compression system can receive the video data from a video processing or video editing system. For example, after video data has been acquired and processed, a video editing system can receive the video data and perform a compression on the video data with the video compression system. This can be done, for example, to convert the video data into a format suitable for editing with the video editing system.

Progressing through individual video frames of the received video data, the video compression system divides the video frame into one or more slices in block 410. As described herein with reference to FIG. 3, a video frame can be divided into a plurality of slices, macroblocks, and/or blocks. Each slice can have an identical number of pixels, blocks, and/or macroblocks, and this can be the same for each slice in each video frame or it can differ from slice to slice or from frame to frame. For example, a slice of a video frame can be made up of a plurality of blocks of image data, wherein each block includes 32×32 pixels, 16×16 pixels, 8×8 pixels, or 4×4 pixels. In some embodiments, blocks can be arranged into macroblocks, wherein each macroblock includes one or more blocks. The blocks in a macroblock can be arranged such that the macroblock comprises a rectangle or square of pixels. For example, a macroblock can comprise 4 blocks each of 8×8 pixels, such that the macroblock can be a square of 16×16 pixels. The slice, then, can include one or more blocks or macroblocks and can have a size of for example and without limitation, 128×16 pixels, 64×16 pixels, 32×16 pixels, or 16×16 pixels.

In block 415, the video compression system groups slices of a video frame into one or more sections. Each section can have a different size. Each section can extend horizontally and/or vertically across an entire video frame. The number of sections can be the same for each video frame or the number of sections can change. The sections can be used by the video compression system to make modifications to compression parameters during compression of a particular video frame so that the encoded or compressed size of the video frame is within a targeted range and/or less than a maximum video frame size.

Progressing through individual slices in the video frame, the video compression system transforms a current slice in block 420. The video compression system transforms the current slice using a DCT or DCT-like transformation to transform information in the slice from the spatial domain to the frequency domain. The result of the transformation can be a matrix or array of elements corresponding to magnitudes of frequency contributions to the spatial information in the slice. The transformation operates in a manner similar to a discrete Fourier transform. Transformation of a video slice is described herein in greater detail with reference to FIG. 5.

In block 425, the video compression system calculates an entropy index for the transformed slice. The entropy index can correspond to the sum of the minimum number of bits needed to represent all the DCT coefficients in a slice, representing the information content of the slice. An entropy index can be calculated separately for luma and chroma transformed values. The entropy index for a slice can be equal to a combination of the entropy index for each of the transformed luma and chroma values. For example, the slice entropy index can be equal to a sum of the transformed luma entropy index and the transformed chroma entropy index. Calculation of the entropy index is described in greater detail herein with reference to FIG. 5.

In block 430, the video compression system generates a quantization table and quantizes the coefficients determined in the transformation of the slice in block 420. The quantization table can be based on a standard quantization table, wherein the standard quantization table is modified for individual slices. In some embodiments, the quantization table can be the same for one or more slices. In some embodiments, the quantization table can be modified for each new slice. For example, the quantization table of the current slice can correspond to a standard quantization table multiplied by a function of the entropy index calculated in block 425. The quantized coefficients can be equal to the DCT coefficients calculated in block 420 scaled by a corresponding quantization table value. The quantized coefficients can be further truncated or rounded to be equal to an integer value. In some embodiments, the quantized coefficients are further encoded using a combination of Huffman coding, run-level coding, and/or arranging coefficients in a designated pattern (e.g., zig-zag scanning).

In block 435, the video compression system evaluates whether all the slices in a section have been compressed. If not, the video compression system returns to block 420 to begin compression of the next slice of the video frame.

If the video compression system has compressed all the slices in a section, the video compression system evaluates whether all the sections in a video frame have been compressed in block 440. If not, the video compression system modifies at least one compression parameter based at least in part on an evaluation of the encoded size of the video frame versus an expected size of the encoded video frame in block 445. The at least one modified compression parameter is then used to adjust the quantization tables for the slices in the next section. The video compression system then returns to block 420 to compress the first slice in the next section. Modification of compression parameters is described in greater detail herein with reference to FIGS. 6-9.

If all the sections have been compressed for a video frame, the video compression system calculates a size of the compressed video frame and compares that size to a targeted video frame size. Based on this comparison, the video compression system updates at least one compression parameter in block 450 for use in compressing the next video frame. The video compression system can then return to block 410 to compress the next video frame of the received video data, represented by the dashed arrow from block 450 to block 410.

The method 400 can be performed in a single pass for each video frame. The method 400 can be performed by the video compression system without the use of an intermediate frame memory for storage of video frames that are yet to be compressed and/or that have been previously compressed. The video compression system can be configured to perform the method 400 in real time, such that a video frame is compressed at a rate that is greater than or equal to the frame rate of the video data.

Figure 5:
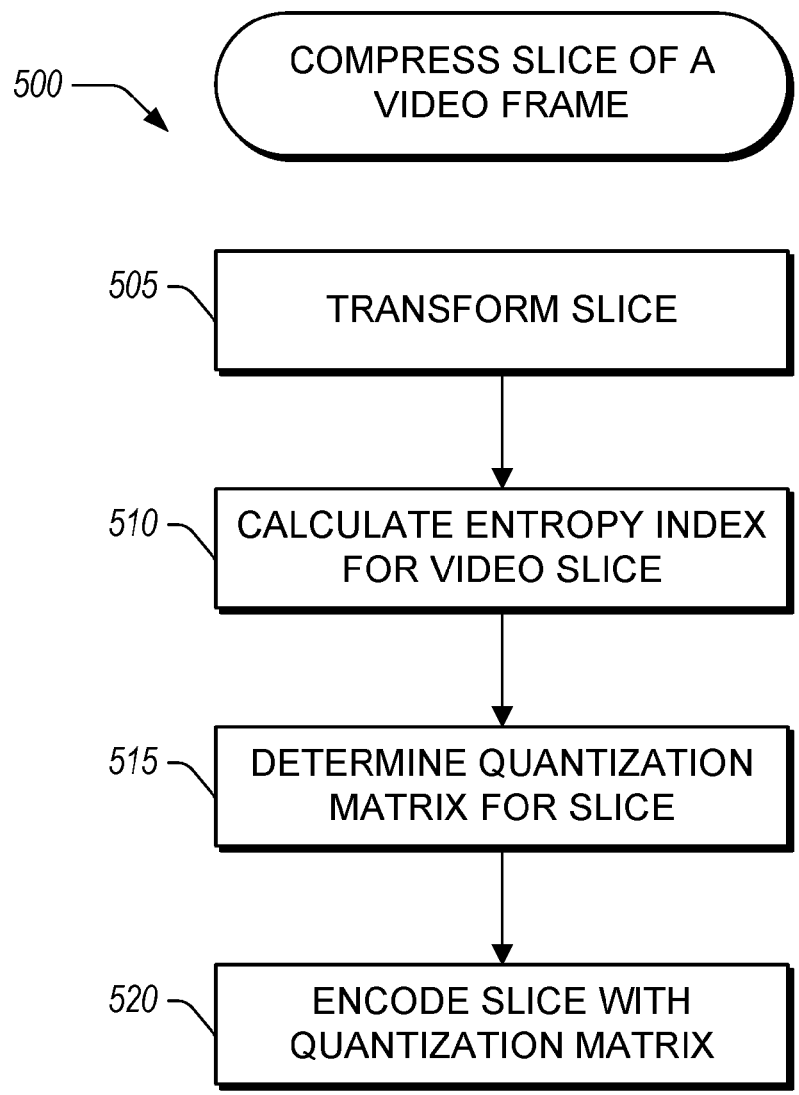
FIG. 5 illustrates a flow chart of an example method of compressing a slice of a video frame.

FIG. 5 illustrates a flow chart of an example method 500 of compressing a slice of a video frame. The method 500 can be used by the video compression system as part of the method 400, described herein with reference to FIG. 4, or as a stand-alone video compression method.

In block 505, the video compression system transforms the slice of the video frame using a DCT or DCT-like transformation. The DCT utilized by the video compression system can be similar to the DCT used in standard compression schemes such as, for example and without limitation, JPEG, MPEG-1, MPEG-2, H.261, H.263, H.264/AVC, H.265/HEVC, Theora, MJPEG, etc. For example, a matrix of DCT coefficients, D, for a slice represented as a matrix of pixel values, M, can be calculated using the following equations:

$$D = T M T^T \quad (1)$$

where T is a matrix of the form:

$$T_{ij} = 1/\text{sqrt}(N) \text{ if } i = 0 \text{ and}$$

$$T_{ij} = \text{sqrt}(2/N)\cos\left[(2j+1)i\pi/2N\right] \text{ if } i \neq 0 \quad (2)$$

and N is the size of the slice (e.g., if M is an 8×8 matrix, N is 8). In some embodiments, the matrix T can be configured to have integer values divided by a fixed number that is a power of 2 (e.g., 1024, 2048, etc.). In some embodiments, the matrix of DCT coefficients, D, is calculated on blocks of 8×8 pixels, but blocks of different sizes can be used. For example and without limitation, blocks can be used with 4×4 pixels, 16×16 pixels, etc. Other methods may also be used to determine the matrix of DCT coefficients.

The video compression system can transform the slice by transforming components of the slice. For example, the slice can comprise a plurality of pixel values for luma of the slice and a plurality of pixel values for chroma of the slice (e.g., the luma and the chroma are components of the slice). The video compression system can determine DCT coefficients for the luma (Y') of the slice and the chroma (Cb, Cr, Cb/Cr) of the slice. Similarly, the video compression system can determine DCT coefficients for individual color channels (e.g., red pixel values of the slice, blue pixel values, green pixel values, etc.), pixel intensity values, pixel alpha channel values, etc.

In block 510, the video compression system calculates an entropy index for the slice of the video frame. The entropy index can be the number of bits needed to represent the transform values for the slice. For example, if a transform value is equal to 5, the number of bits needed to represent that number is 3 (e.g., in binary 5 is equal to 101). As another example, the number 32 needs 6 bits (100000). The number 0 requires 0 bits, as it can be discarded for compression purposes. The entropy index can be calculated by aggregating the number of bits needed to represent each transform value in the slice.

In some embodiments, the entropy index is calculated separately for each transform within a slice. For example, where the video compression system transforms the luma and the chroma separately (e.g., calculating $D_l$ and $D_c$), the video compression system can determine a luma entropy index and a chroma entropy index. The entropy index of the slice can be a combination of these entropy indices. For example, the entropy index of the slice can be a linear combination (e.g., a simple sum) of the luma entropy index and the chroma entropy index.

In some embodiments, the entropy index is further modified by an entropy multiplier. The entropy index of the slice, the luma entropy index, and/or the chroma entropy index can be multiplied by an entropy multiplier. In certain implementations, each of the entropy index of the slice, the luma entropy index, and the chroma entropy index can have an individual entropy multiplier used to scale the corresponding entropy index. The video compression system can modify or adjust the entropy multiplier based at least in part on compression results from a previous slice, section, and/or video frame.

In block 515, the video compression system determines a quantization matrix, Q, for the slice. The quantization matrix can be based on a standard quantization matrix, $Q_s$. For example, the JPEG standard quantization matrix Q50 can be used as a basis for the quantization matrix, Q, used to quantize the transform coefficients, D, determined in block 505. The quantization matrix, Q, can be determined for a particular slice by scaling the standard quantization matrix, $Q_s$, by a quantization scale value, Qscale. The value of Qscale can correspond to a product of the entropy index determined in block 510 and a factor called QscaleFactor. In some implementations, the quantization matrix can be defined as:

$$Q = Q_s * Q\text{scale} \quad (3)$$

where Qscale is defined as:

$$Q\text{scale} = (\text{Entropy Index} * Q\text{scaleFactor})/\text{Target Slice Size} \quad (4)$$

The entropy index can be the total entropy index for the slice. The target slice size can be a targeted size for the slice after compression. The value of QscaleFactor can be tuned or tailored to provide desirable or targeted compression results. In some embodiments, the target slice size is represented as a number of bits used to express the compressed slice. In some embodiments, the quantization matrix, Q, can be based on a lookup table rather than using equations (3) and (4).

In block 520, the video compression system uses the quantization matrix, Q, to encode the slice. In some embodiments, the encoded slice is a matrix, C, with elements that are equal to the transform coefficients (e.g., the elements of the matrix D) divided by corresponding elements from the quantization table (e.g., the elements of the matrix Q). For example, an element of the encoded matrix, C, can be defined as:

$$C_{ij} = \text{round}(D_{ij}/Q_{ij})$$

The slice can be encoded for each transform matrix determined in block 505. For example, the luma and chroma transformations can each be separately encoded. The rounding function can be used to truncate floating point numbers to integers, in some implementations. Other suitable mathematical functions may be used to reduce the amount of information in the encoded matrix to achieve targeted compression performance.

In some embodiments, the slice is further encoded using a combination of Huffman coding, run-level coding, exponential Golomb encoding, Goiomb Rice encoding, and/or arranging coefficients in a designated pattern (e.g., zig-zag scanning).

Figure 6:
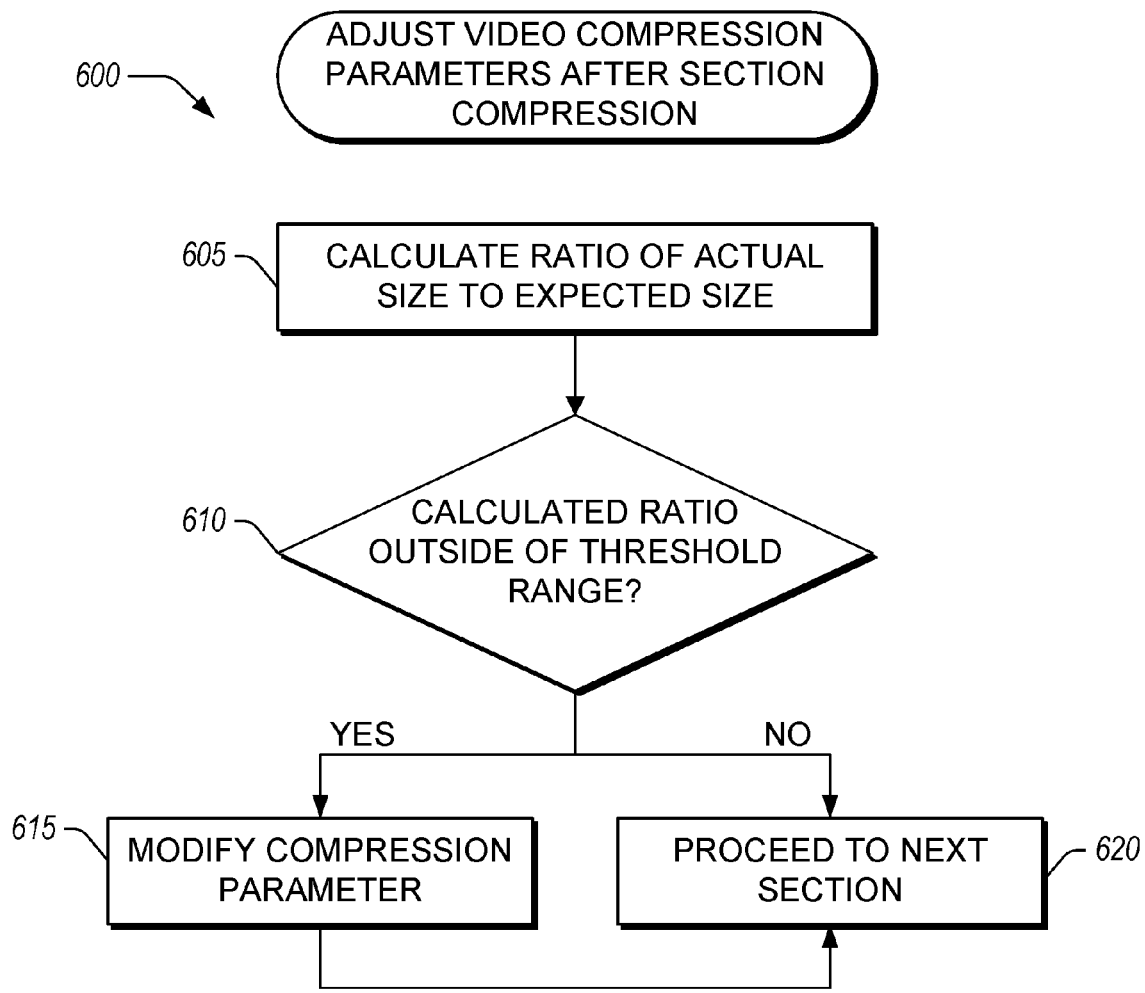
FIG. 6 illustrates a flow chart of an example method of adjusting video compression parameters after compressing a section of a video frame.

FIG. 6 illustrates a flow chart of an example method 600 of adjusting video compression parameters after compressing a section of a video frame. The method 600 can be used in conjunction with the method 400, described herein with reference to FIG. 4.

In block 605, the video compression system calculates a ratio of the actual compressed size of the video frame to this point to the expected compressed size. The actual compressed size can be a sum of the bits used to represent the encoded slices (e.g., the matrix C described with reference to FIG. 5) within each previous section of the video frame. The expected compressed size can be defined as:

Expected=Target Frame Size Encoded Slices/Total Slices in Frame where Encoded Slices refers to the number of slices encoded and Total Slices in Frame refers to the total number of slices in the current video frame.

In certain implementations, the calculated ratio for the frame and section can be stored, such as in a storage device as described herein. The video compression system can use the stored calculated ratio from a previous frame to determine whether to modify a compression parameter for the current frame.

In block 610, the video compression system compares the ratio calculated in block 605 to threshold values. For example, an upper threshold can be 1.25 and a lower threshold can be 0.75. In this example, if the ratio of the actual compressed size to expected compressed size is between the upper and lower thresholds, no changes are made to compression parameters. If the ratio is outside of the upper and/or lower threshold values, a change can be made to compression parameters. In some embodiments, the threshold values can centered around 1 or at least bracket 1, indicating that the compression is expected to achieve a targeted file size after encoding of the entire video frame. The lower threshold can be at least 0.5, 0.6, 0.7, 0.75, 0.8, 0.85, 0.9, 0.95, or 0.99. The upper threshold can be less than or equal to 1.01, 1.05, 1.1, 1.15, 1.2, 1.25, 1.3, 1.4, 1.5, or 2.

In block 615, the video compression system modifies the entropy multiplier described herein with reference to FIG. 5 if the calculated ratio of actual to expected compressed size is outside the threshold range defined by the upper and lower thresholds. Modifying the entropy multiplier has the effect of modifying the quantization table used to encode or compress the next section in the video frame. This can be used to increase or decrease the amount of compression on the fly during compression of a video frame to increase the likelihood and/or to ensure that the compressed frame size is within a targeted range.

The video compression system can use a lookup table to determine the entropy multiplier to use for the next video frame or next section in a video frame. In some embodiments, the video compression system can be configured to compare a calculated ratio for the current frame to a stored calculated ratio for the previous frame. If the calculated ratios are similar, the video compression system can analyze the compressed size of the previous video frame to determine whether to modify the entropy multiplier. For example, where contiguous frames are similar in content, the result of the compression of the video frames should be similar as well. Accordingly, if the calculated ratios for contiguous frames are similar at the same point in the compression process, it is likely they will have similar end results as well. Thus, the video compression system can base a decision to modify a compression parameter, such as the entropy multiplier, at least in part on a result of the compression of the previous frame. If the previous frame was near a maximum frame size, the video compression system can decide to increase the entropy multiplier (e.g., to increase the amount of compression).

In some embodiments, the threshold for the calculated ratio is set to 1. The video compression system can be configured to modify one or more of the compression parameters (e.g., entropy multiplier) where the calculated ratio differs from the threshold by a predefined amount. For example, if the calculated ratio is within 5% of the threshold, the video compression system can be configured to leave the compression parameters unmodified. If the calculated ratio is between 5% and 10% over or under the threshold, the video compression system can be configured to respectively increase or decrease the entropy multiplier by 5% (e.g., change the entropy multiplier from 1 to 1.05 if the calculated ratio is 1.06). Similar ranges and changes can be programmed into a lookup table. These ranges can be useful to reduce or eliminate changes to compression parameters that may otherwise arise due to random fluctuations in video frames.

In some embodiments, the video compression system can be configured to modify the compression parameters based at least in part on the number of slices that have been compressed. For example, early in the compression process for a particular video frame, changes to the compression parameters may be smaller than changes that occur later in the compression process.

In some embodiments, the compression parameters can be modified at the end of a video frame based on the compression results from each section. For example, the entropy multiplier for a subsequent video frame can be set to a weighted average of the entropy multipliers for each section of the current video frame. The weight can be based at least in part on the number of slices in the section, the amount of information in the section, the location of the section within the frame, or the like. In some embodiments, the entropy multiplier is initialized to 1 at the beginning of the compression process.

In block 620, the video compression system proceeds to the next section or video frame to continue the compression procedure. The next section or next frame can then be compressed using the modified or unmodified compression parameters depending on the results of the comparison in block 610.

Figure 7:
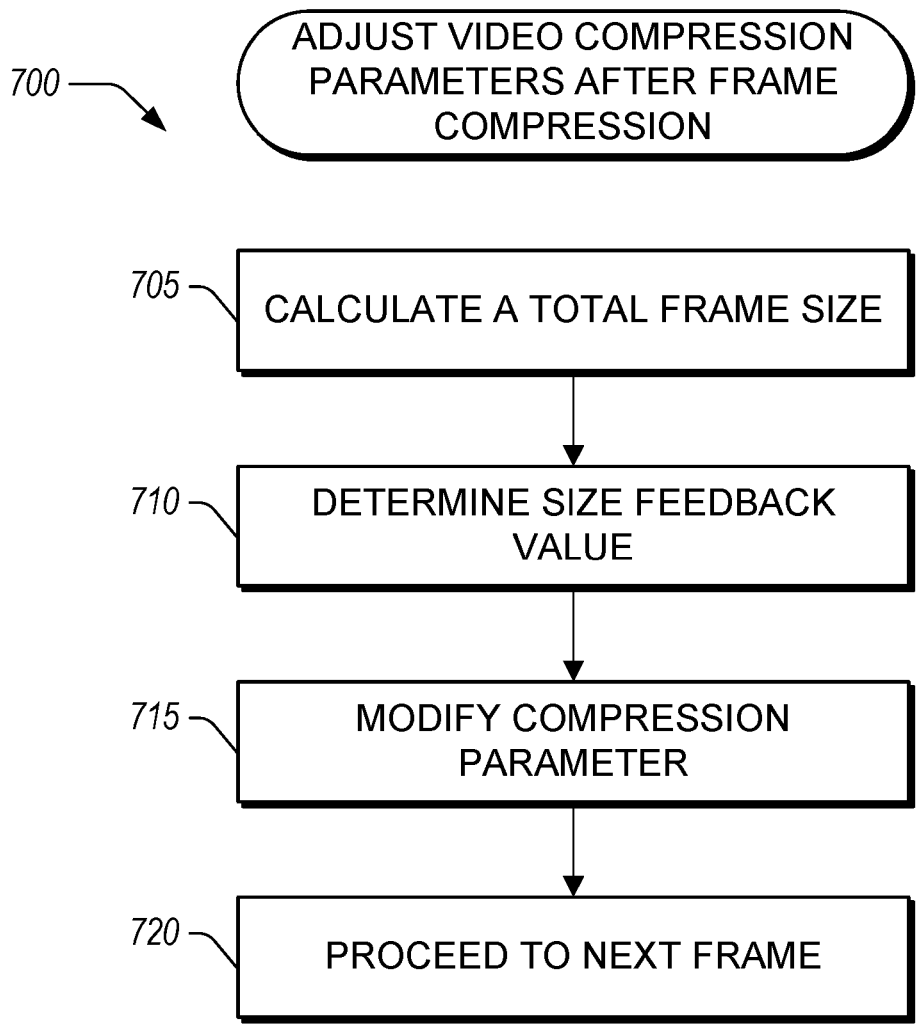
FIG. 7 illustrates a flow chart of an example method of adjusting video compression parameters after compressing a video frame.

FIG. 7 illustrates a flow chart of an example method 700 of adjusting video compression parameters after compressing a video frame. The method 700 can be used in conjunction with the method 400 described herein with reference to FIG. 4.

In block 705, after compressing an entire video frame, the video compression system calculates a total frame size for the compressed video frame. The total frame size can correspond to a total number of bits used to represent the compressed video frame.

In block 710, the video compression system determines a size feedback value based on a targeted frame size. The targeted frame size can be a desired, selected, or predetermined frame size represented as a number of bits. The targeted frame size can be a range of sizes. The targeted frame size can differ from a maximum frame size that is used to set an upper limit on the size of a compressed video frame. For example, the video compression system can be configured to allow a video frame size to exceed the targeted frame size value but to not exceed the maximum frame size value. In certain implementations, the size feedback value can be a ratio of the target frame size to the total frame size calculated in block 710.

In block 715, the video compression system modifies one or more compression parameters based on the size feedback value. For example, the video compression system can be configured to modify the entropy multiplier based on the size feedback value. The video compression system can then use the modified entropy multiplier when compressing the subsequent video frame. As described herein, the entropy multiplier can be used to modify the entropy index of a slice, which in turn affects the quantization table and resulting compressed size of the slice.

By way of example, the video compression system can modify the entropy multiplier based on the following pseudo-code:

```
if (size feedback value < 1)
    Entropy Multiplier *= 1 + (1 - size feedback value) * 4.0;
else if (size feedback value > 2)
    Entropy Multiplier *= 1 + (1 - size feedback value) * 0.75;
else if (size feedback value > 1.5)
    Entropy Multiplier *= 1 + (1 - size feedback value) * 0.5;
else
    Entropy Multiplier *= 1 + (1 - size feedback value) * 0.25;
```

Thus, the closer the size feedback value is to 1, the smaller the change to the entropy multiplier. In some embodiments, the video compression system can be configured to not change the entropy multiplier unless the size feedback value is greater than or equal to a threshold amount away from 1. This threshold amount can be less than or equal to about 1%, 2%, 3%, 4%, 5%, 6%, 7%, 8%, 9%, 10%, 15%, or 20%. In certain implementations, the entropy multiplier that is being modified is the weighted average of entropy multipliers used to compress different sections of the video frame.

In block 720, the video compression system proceeds to the next video frame to continue the compression procedure. The next frame can then be compressed using the modified or unmodified compression parameters.

Figure 8:
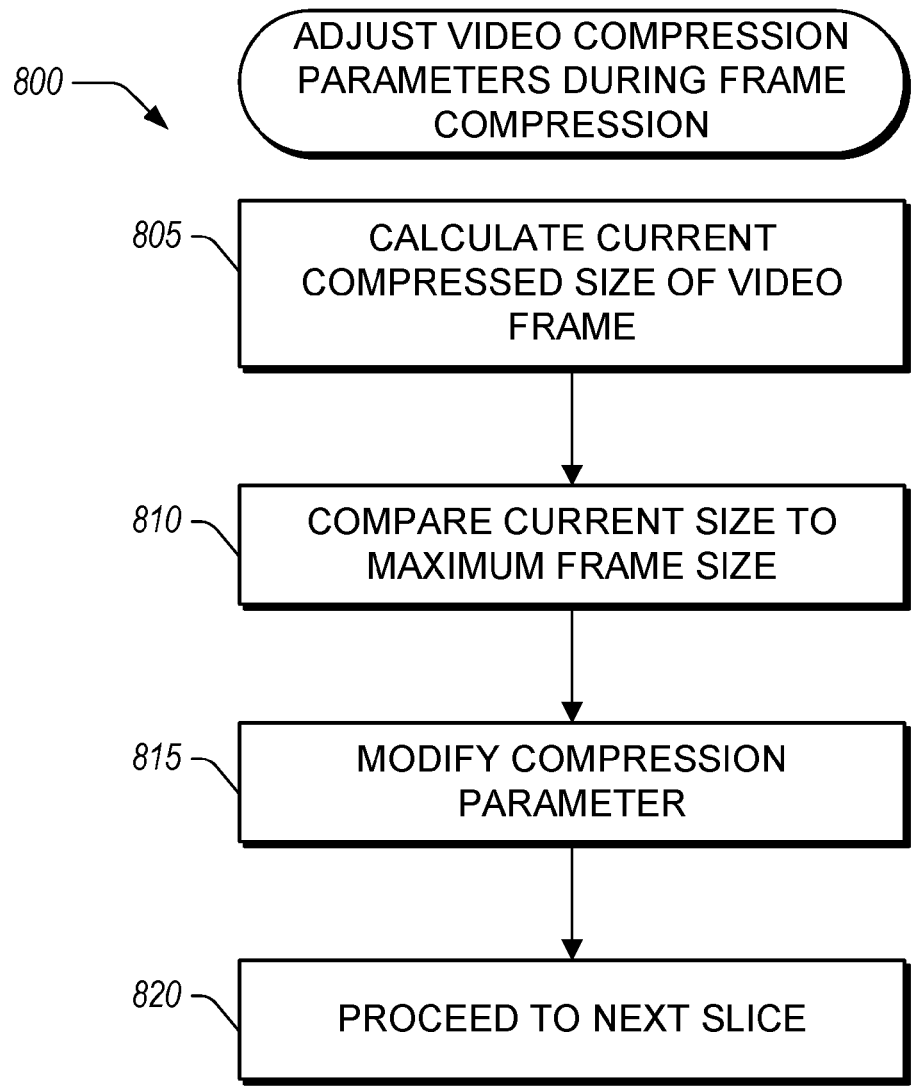
FIG. 8 illustrates a flow chart of an example method of adjusting video compression parameters based on an accumulated size of a compressed video frame while compressing the video frame.

FIG. 8 illustrates a flow chart of an example method 800 of adjusting video compression parameters based on an accumulated size of a compressed video frame while compressing the video frame. The method 800 can be used in conjunction with the method 400 described herein with reference to FIG. 4.

In block 805, during compression of a video frame, the video compression system calculates the current compressed size of the video frame. The current compressed size of the video frame can be a sum of the bits used to represent the size of all of the slices compressed in the current video frame.

In block 810, the video compression system compares the current compressed size of the video frame to a maximum video frame size. Depending on the proximity of the current compressed size to the maximum frame size, the video compression system can modify one or more compression parameters in block 815 so that the final size of the compressed video frame is less than or equal to the maximum frame size.

For example, if the current compressed size of the video frame is X % of the maximum frame size, the video compression system can increase the value of Qscale (described herein with reference to FIG. 4), the multiplier for the quantization table, Q, by a predetermined, desired, or selected amount, y. By way of example, the video compression system can be configured to increase Qscale by 1 when the current compressed size is 90% of the maximum frame size, to increase Qscale by 2 when the current compressed size is 95% of the maximum frame size, to increase Qscale by 4 when the current compressed size is 97.5% of the maximum frame size, etc. Other methods of modifying Qscale can be used, such as using different functions, lookup tables, or the like.

In block 820, the video compression system proceeds to the next slice to continue the compression procedure. The next slice can then be compressed using the modified or unmodified compression parameters.

Figure 9:
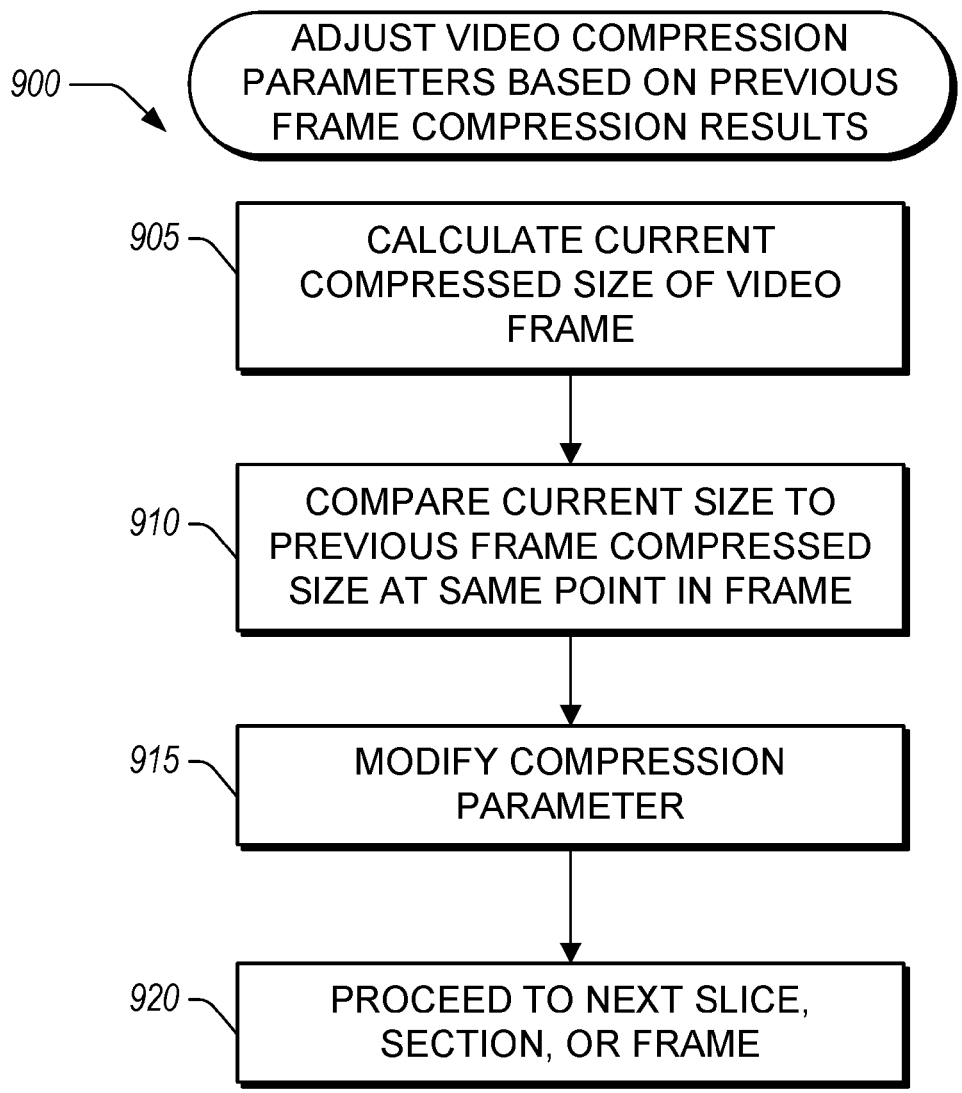
FIG. 9 illustrates a flow chart of an example method of adjusting video compression parameters based on an accumulated size of a compressed video frame relative to an accumulated size of a previous frame or frames after the same section within the frames.

FIG. 9 illustrates a flow chart of an example method 900 of adjusting video compression parameters based on an accumulated size of a compressed video frame relative to an accumulated size of a previous frame or frames after the same section within the frames. The method 900 can be used in conjunction with the method 400 described herein with reference to FIG. 4.

In block 905, during compression of a video frame, the video compression system calculates the current compressed size of the video frame. The current compressed size of the video frame can be a sum of the bits used to represent the size of all of the slices compressed in the current video frame.

In block 910, the video compression system compares the current compressed size of the video frame to the compressed size of the previous video frame after an equivalent or approximately equal number of sections, slices, macroblocks, or blocks had been compressed. In some implementations, one or more previous frames can be used in the comparison. For example, an average or median value of the compressed size can be determined for a plurality of previous frames, the compressed size being calculated after each slice and/or section in each frame. Depending on the proximity of the current compressed size to the compressed size of the previous frame (or frames) at the same (or substantially the same) point in the frame(s), the video compression system can modify one or more compression parameters in block 915 (e.g., by using the method 600 described herein with reference to FIG. 6). This comparison can be done to avoid or reduce the likelihood of modifying the entropy multiplier too often during compression. This can lead to a more stable compression procedure with satisfactory results. In some embodiments, depending on the proximity of the current compressed size to the compressed size of the previous frame (or frames) at the same (or substantially the same) point in the frame(s), the video compression system can use the compressed size of the previous frame or frames, or the compressed size of the previous frame or frames at the same point in the frame, to modify one or more compression parameters in block 915 (e.g., by using the method 600 described herein with reference to FIG. 6).

In some embodiments, two thresholds can be defined, T1 and T2. The first threshold, T1, can be defined as a ratio of the size of the previously encoded frame after the same section in the previous frame, Xp. If the encoded size of the current frame, X, is between $Xp*(1+T1)$ and $Xp*(1-T1)$, then the compression parameters can remain unchanged. The second threshold, T2, can be defined as a second ratio of the size of the previously encoded frame after the same section in the previous frame, Xp. If the encoded size of the current frame, X, is between $Xp*(1+T2)$ and $Xp*(1-T2)$, then the compression parameters can be modified based on the size of the previously encoded frame after the same section in the previous frame, Xp, rather than the expected image size, as in the method 600. In some implementations, the first threshold, T1, can be less than or equal to 0.01, 0.02, 0.03, 0.04, 0.05, 0.06, 0.07, 0.08, 0.09, 0.1, 0.15, 0.2, or 0.25. In some implementations, the second threshold, T2, can be less than or equal to 0.02, 0.03, 0.04, 0.05, 0.06, 0.07, 0.08, 0.09, 0.1, 0.15, 0.2, 0.25, 0.3, 0.4, 0.5, or 0.75. In some implementations, the second threshold, T2, is defined in terms of the first threshold, T1, or vice versa. For example, the second threshold can be set to $T2=n*T1$, where n is a number greater than 1. This multiplicative factor, n, can be, for example, at least 1.05, 1.1, 1.2, 1.3, 1.4, 1.5, 1.6, 1.7, 1.8, 1.9, 2, 2.5, 3, 3.5, 4, 4.5, or 5.

Accordingly, the method 900 can be understood as a further refinement of the method 600. For example, rather than calculating the ratio of actual size, X, to expected size in block 605 of the method 600, the video compression system can calculate the ratio of the size of the previously encoded frame after the same section in the previous frame, Xp, to expected size. This can then be used to determine whether to modify the compression parameters in block 615.

After modifying the compression parameters, the video compression system can continue the compression procedure by proceeding to the next slice, section, or video frame in block 920.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms). Moreover, in certain embodiments, acts or events can be performed concurrently, e.g., through multithreaded processing, interrupt processing, or multiple processors or processor cores or on other parallel architectures, rather than sequentially.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out innovative features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description.

What is claimed is:

1. A video camera, comprising:
   at least one memory device;
   one or more image sensors configured to convert light incident on the image sensor into video data, the video data comprising a plurality of video frames including a first video frame and a second video frame; and
   a compression system configured to:
      divide the first video frame into slices;
      group a first plurality of the slices into a first section and a second plurality of the slices into a second section, the first plurality of the slices being different from the second plurality of the slices;
      for each slice in the first section,
         transform the slice using a discrete cosine transform to thereby obtain a transformed slice;
         calculate an entropy index for the transformed slice to thereby obtain a calculated entropy index, the calculated entropy index corresponding to an amount of information in bits of the transformed slice; and
         quantize the transformed slice using a first quantization table generated using a first plurality of compression parameters, the first plurality of compression parameters including the calculated entropy index;
      modify at least one compression parameter of the first plurality of compression parameters based on a compressed size of the first section to thereby obtain a second plurality of compression parameters; and
      compress the slices of the second section using the second plurality of compression parameters rather than the first plurality of compression parameters.

2. The video camera of claim 1, wherein the slices are further divided into macroblocks, the macroblocks each comprising a different 16×16 array of pixel values of the first video frame.

3. The video camera of claim 1, wherein the quantization table is generated by multiplying a standard quantization table by the calculated entropy index.

4. The video camera of claim 3, wherein the quantization table is generated by multiplying the standard quantization table by the calculated entropy index and an entropy multiplier.

5. The video camera of claim 1, wherein the second plurality of compression parameters comprises an entropy multiplier used to generate a second quantization table for the second section, and the entropy multiplier is modified based on the compressed size.

6. A video camera, comprising:
   at least one memory device;
   one or more image sensors configured to convert light incident on the image sensor into video data, the video data comprising a plurality of video frames that each comprise a two-dimensional array of pixel values; and
   a compression system comprising one or more hardware processors, the compression system configured to execute instructions stored on the at least one memory device, the stored instructions configured to cause the one or more hardware processors to perform at least the steps of:
      for a video frame of the plurality of video frames, dividing the video frame into a plurality of sections including a first section and a second section different from the first section, the plurality of sections each comprising a plurality of slices, the plurality of slices each comprising a different subset of the two-dimensional array of pixel values of the video frame;

compressing each slice in the first section using a discrete cosine transformation and a quantization table to thereby obtain a compressed first section;

after compressing the slices in the first section,
determining a current size of the video frame with compression, and
modifying the quantization table based on the current size and an expected size of the video frame with compression to thereby obtain a modified quantization table; and compressing each slice in the second section using the discrete cosine transformation and the modified quantization table.

7. The video camera of claim 6, wherein the expected size is equal to a targeted frame size multiplied by a ratio of a number of slices already compressed to a total number of slices in the video frame.

8. The video camera of claim 6, wherein modifying the quantization table comprises multiplying elements of a quantization matrix by a quantization scale value.

9. The video camera of claim 8, wherein the quantization scale value is equal to an entropy index value multiplied by a quantization scale factor and divided by a targeted size of a slice, the entropy index value equal to a number of bits required to represent a compressed slice or section.

10. The video camera of claim 6, wherein the stored instructions are further configured to cause the one or more hardware processors to perform at least the steps of modifying the quantization table based on the current size and a targeted maximum size of the video frame with compression.

11. The video camera of claim 6, wherein the stored instructions are further configured to cause the one or more hardware processors to perform at least the steps of modifying the quantization table based on a comparison of the current size to a size of a previously compressed video frame after an equivalent number of slices had been compressed.

12. A method of compressing video data, the video data comprising a plurality of video frames each comprising a two-dimensional array of pixel values, the video data having a frame rate, the method comprising:

for a video frame of the plurality of video frames, dividing the video frame into a plurality of sections including a first section and a second section different from the first section, the plurality of sections each comprising a plurality of slices, the plurality of slices each comprising a different subset of the two-dimensional array of pixel values of the video frame;

compressing each slice in the first section using a discrete cosine transformation and a quantization table to thereby obtain a compressed first section;

after compressing the slices in the first section,
determining a current size of the video frame with compression, and
modifying the quantization table based on the current size and an expected size of the video frame with compression to thereby obtain a modified quantization table; and compressing each slice in the second section using the discrete cosine transformation and the modified quantization table.

13. The method of claim 12, wherein the video frame is compressed at a rate that is at least as fast as the frame rate.

14. The method of claim 12, wherein the video frame is compressed in real time.

15. The method of claim 14, wherein the video frame comprises at least about 1920 horizontal pixels.

16. The method of claim 14, wherein the frame rate is between about 24 frames per second and 60 frames per second.

17. The method of claim 13, wherein the frame rate is at least 30 frames per second.

18. The method of claim 13, wherein the video frame comprises between 1920 horizontal pixels and 4000 horizontal pixels.

19. The video camera of claim 6, wherein the first section extends across an entirety of the video frame, and the second section extends across the entirety of the video frame.

20. The video camera of claim 6, wherein the stored instructions are configured to cause the one or more hardware processors to compress the first section and the second section a single time rather than a plurality of times.

* * * * *

UNITED STATES PATENT AND TRADEMARK OFFICE
CERTIFICATE OF CORRECTION

PATENT NO. : 9,800,875 B2
APPLICATION NO. : 15/092470
DATED : October 24, 2017
INVENTOR(S) : Manjunath Subray Bhat Page 1 of 1

It is certified that error appears in the above-identified patent and that said Letters Patent is hereby corrected as shown below:

On the Title Page

Item (57), Abstract at Line 8, Change "in," to --in--.

In the Specification

In Column 7 at Line 30, Change "dements" to --elements--.

In Column 11 at Line 40, Change "of" to --of,--.

In Column 14 at Line 41, Change "C," to --$C_{ij}$,--.

In Column 14 at Line 55, Change "Goiomb" to --Golomb--.

In Column 15 at Lines 4-5 (approx.), Change "Expected=Target Frame Size Encoded Slices/Total Slices in Frame" to --*Expected = Target Frame Size * Encoded Slices / Total Slices in Frame*--.

Signed and Sealed this
Eighteenth Day of June, 2019

Andrei Iancu
*Director of the United States Patent and Trademark Office*